June 21, 1960

J. F. RILEY 2,941,258

METHOD OF ASSEMBLING AND ENCAPSULATING
A PLURALITY OF ELECTRICAL CONDENSERS

Filed April 5, 1954

Inventor
Joseph F. Riley
By Schroeder, Hofgren, Brady & Wegner
Attorneys

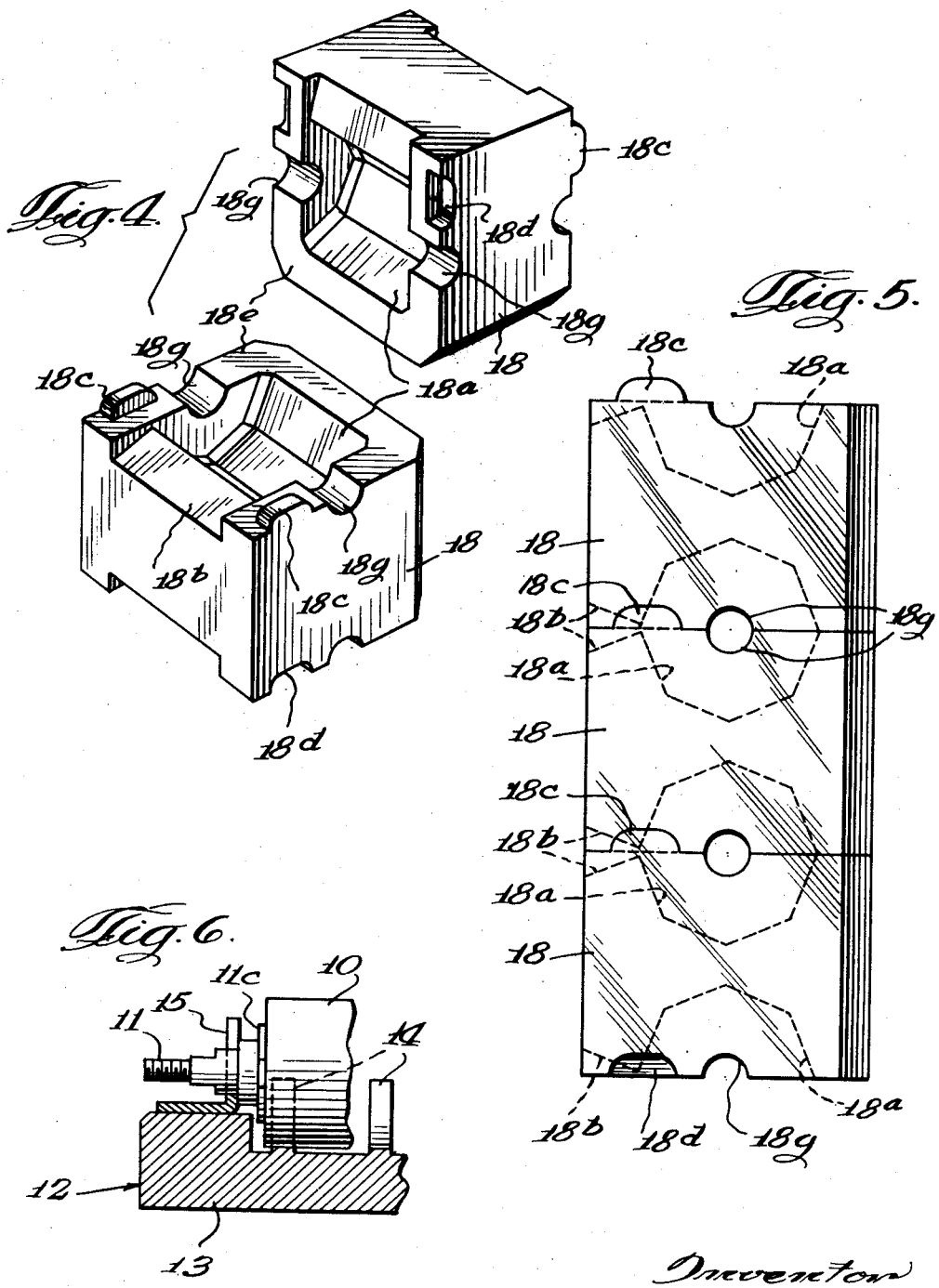

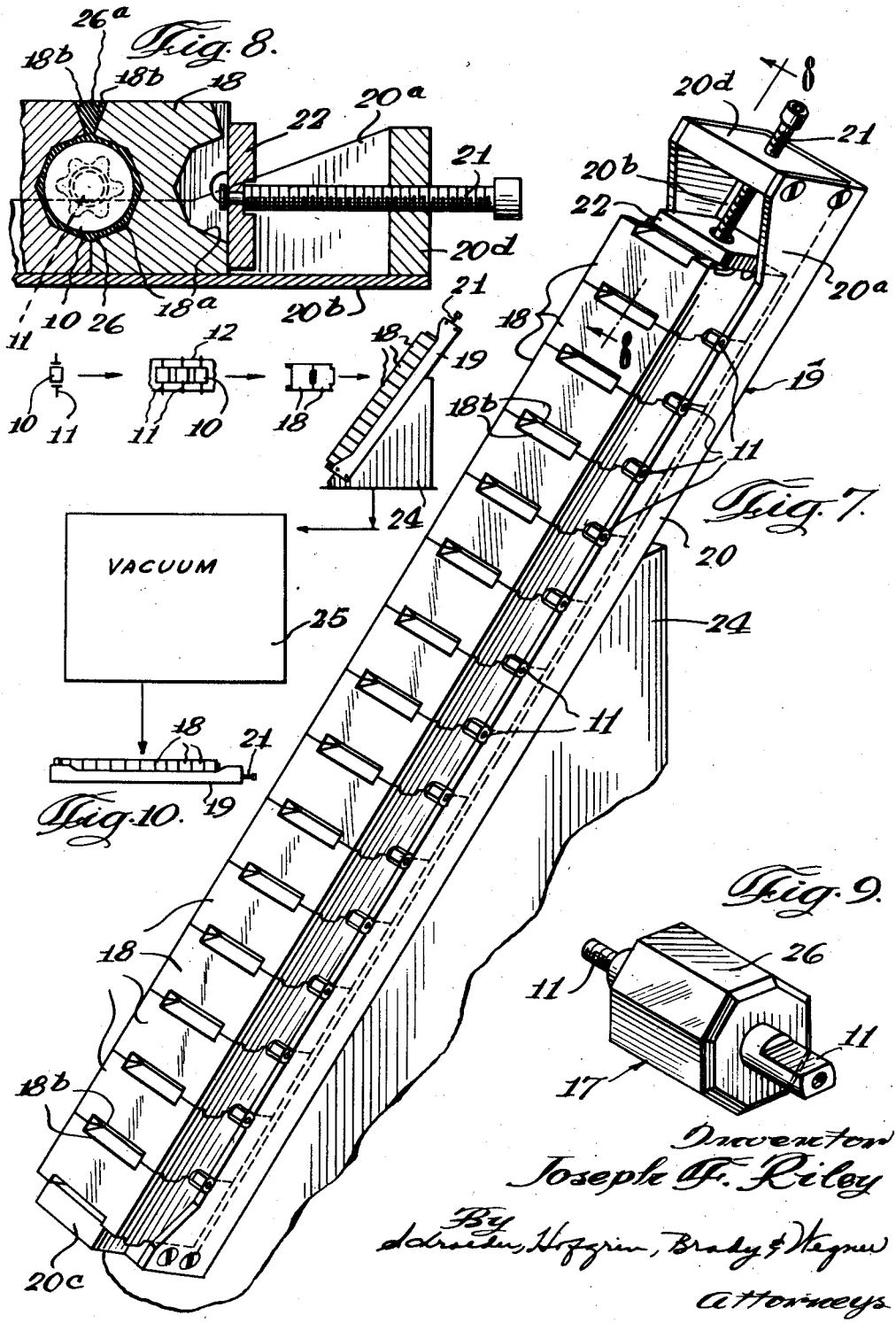

United States Patent Office 2,941,258
Patented June 21, 1960

2,941,258

METHOD OF ASSEMBLING AND ENCAPSULATING A PLURALITY OF ELECTRICAL CONDENSERS

Joseph F. Riley, Chicago, Ill., assignor, by mesne assignments, to P. R. Mallory & Co. Inc., Indianapolis, Ind., a corporation of Delaware Filed Apr. 5, 1954, Ser. No. 420,916

6 Claims. (Cl. 18—59)

This invention relates to methods for making electrical condensers.

Certain types of electrical condensers include a dielectric body usually of a ceramic material with a pair of terminals on opposite sides of the body for connecting in an electrical circuit and a dielectric covering around the body to protect this body and the inner ends of the terminals.

In the past this type of an electrical condenser has been made more or less individually so that the cost has tended to be excessive and the condensers did not have the reliability ordinarily associated with mass produced items. The methods and apparatus of this invention permit the mass production of condensers of relatively simple construction and these condensers are extremely reliable in operation so that the condensers, while being relatively inexpensive, are extremely rugged and exhibit long life.

One of the features of this invention is to provide an improved method of making a plurality of electrical condensers comprising positioning a plurality of dielectric bodies in spaced relationship to each other, arranging a pair of terminals on opposite sides of each body with each terminal including a base bearing against the body but unattached thereto and molding a moldable dielectric material around each of these bodies and bases while maintaining this relationship of each body and pair of terminals.

Another feature of this invention is to provide such an improved method of making a plurality of condensers in which the pair of terminals for each body are positioned on opposite sides of the body with each terminal including a base having a plurality of spring fingers bearing against the body but unattached thereto and an outwardly projecting shank, transferring each assembly of body and a pair of terminals to a mold while maintaining the spring fingers in their relationship against the body, surrounding each body and pair of bases of the terminals with a flowable moldable dielectric material, subjecting this material to a vacuum to remove entrapped gases and molding the material while maintaining this clamped relationship.

Other features and advantages of the invention will be apparent from the following description of embodiments thereof, taken in conjunction with the accompanying drawings. Of the drawings:

Fig. 4 is an exploded view showing a pair of cooperating mold sections in perspective.

Fig. 5 is an end elevational view showing a plurality of mold sections in assembled relationship.

Fig. 6 is a fragmentary sectional view, taken substantially along line 6—6 of Fig. 2.

Fig. 7 is a perspective view showing a plurality of mold sections in assembled relationship in a clamping device illustrating one operation in the method of this invention.

Fig. 8 is a sectional view, taken substantially along line 8—8 of Fig. 7.

Fig. 9 is a perspective view of a finished condenser of this invention.

Fig. 10 is a semi-diagrammatic view showing a simplified flow sheet illustrating the methods and apparatus of this invention.

Figure 1:
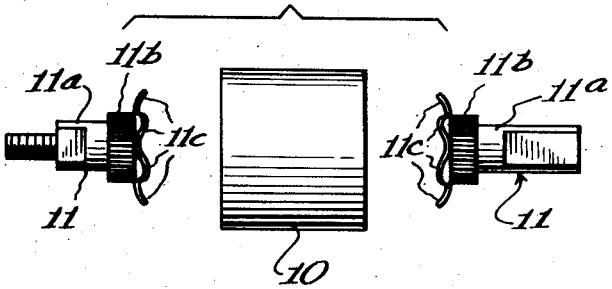
Fig. 1 is an exploded elevational view showing a condenser body and a pair of terminals arranged on opposite sides thereof.

In the embodiment shown in the drawings, each electrical condenser includes a substantially cylindrical dielectric body 10 and a pair of end terminals 11. Each end terminal includes a shank portion 11a for connection in an electrical circuit and a base portion 11b adapted to make electrical contact with a conducting plate 23 at each end of the dielectric body 10. Each base portion 11b is provided with a plurality of substantially circularly arranged spring fingers 11c that when in undistorted position are arranged in a convex dish shape when viewed from the inner end thereof. These spring fingers are distortable toward a co-planar position when pressure is applied on the inner surfaces thereof.

Each end of the dielectric body 10 is provided with an electrical conductive coating 23 in the usual manner. This may be a thin layer of silver or the like against which the spring fingers 11c are adapted to make contact.

In the assembling of a plurality of dielectric bodies 10 and a plurality of pairs of end terminals 11 a centering device 12 is preferably employed. This centering device comprises an elongated base 13 provided with means for removably retaining a plurality of dielectric bodies 10. In the embodiment shown, this means includes a pair of substantially parallel spaced rails 14 mounted on the base 13 and extending upwardly thereof, with these rails having aligned concave cut-out sections 14a at the upper edges of the rails. Each pair of aligned cut-out sections 14a is adapted to hold a condenser body 10, as shown in Figs. 2 and 3.

Positioned outwardly of the rails 14 are a second pair of rails 15 also extending upwardly from the base 13 and substantially parallel to each other and to the first rails 14. Each rail 15 is in the form of a strip of angle metal with the bottom of each angle attached to the base 13 as by means of screws 16.

The upwardly extending portion 15a of each of the second rails 15 is provided with a downwardly extending groove 15b located opposite a cut-out section 14a and aligned therewith. Each groove 15b has a rounded bottom aligned with a section 14a, as shown in Fig. 3. Each second rail is so positioned with respect to a first rail 14 that when the terminal 11 is inserted into a groove, as shown in Figs. 2 and 3, the spring fingers 11c of the terminal will be centered with respect to the end of a body 10 and distorted outwardly for firm seating against the end of a dielectric body by the distortion of these spring fingers. This distortion and the resiliency of these fingers holds the terminals and bodies in assembled relationship, with the terminals being otherwise unattached to the bodies.

Figure 2:
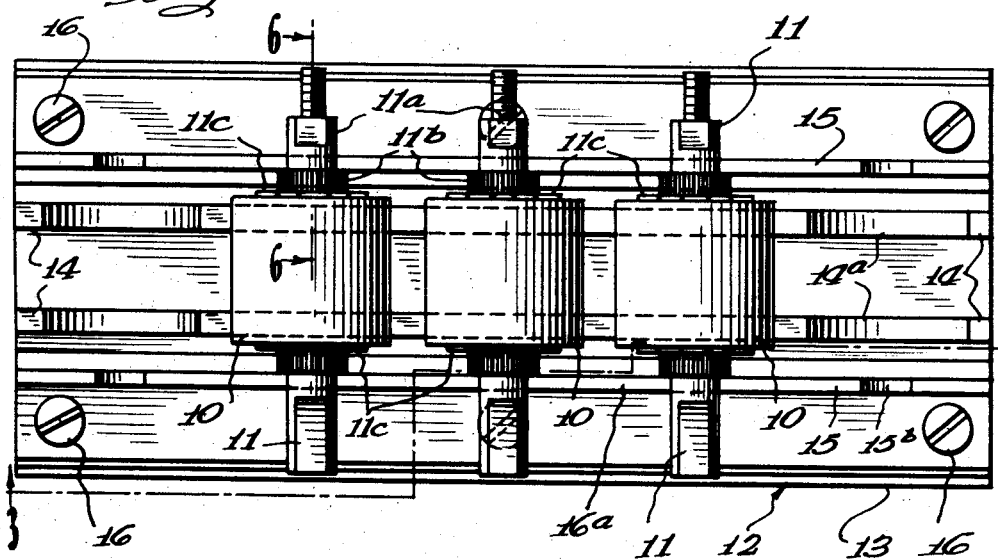
Fig. 2 is a plan view of a centering device used in assembling a plurality of condenser bodies and end terminals.
Figure 3:
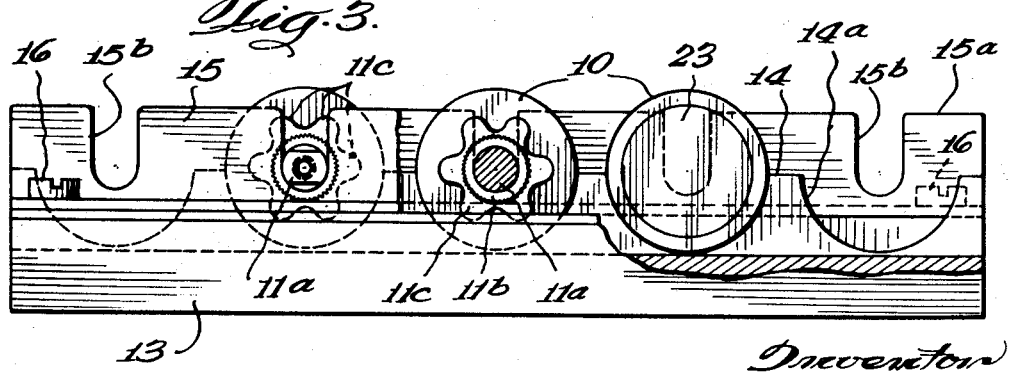
Fig. 3 is a sectional elevation, taken substantially along line 3—3 of Fig. 2.

During the manufacturing operation of the electrical condensers 17, one embodiment of which is shown in Figure 9, a plurality of molds are employed for retaining each assembly of a dielectric body and end terminals in substantially the same frictional relationship, as is illustrated in Figs. 2 and 3. In the embodiment shown, these molds comprise a plurality of mold sections 18 that are adapted to be arranged in cooperating relationship to define a plurality of molds. As is shown in Figs. 5 and 7, the molds are adapted to be arranged in end-to-end relationship with the contacting areas of the sections being hollowed out to define a mold cavity 18a.

As is shown in Fig. 4, one side of each mold section 18 which contains its part of a mold cavity has an outwardly sloped rim 18b leading to the mold cavity 18a. The remaining margin around the cavity 18a is provided with interlocking means for normally separably retaining the mold sections in contact with each other. Here this interlocking means comprises a pair of side projections 18c each adapted frictionally to engage a corresponding cavity 18d at the side of the rim of the next mold. Thus, each mold section has a pair of projections 18c on one side and a pair of correspondingly shaped cavities 18d on the opposite side. These are all located around the rim defining a mold cavity 18a. With this construction any pair of mold sections can readily be assembled to form a mold cavity, as is shown in Fig. 5. Furthermore, the sloped rim portions 18b cooperate to define a mold opening for charging moldable material into the mold cavity 18a.

In order to retain a dielectric body 10 and its pair of terminals 11 in the assembled positions shown in Fig. 2 each rim 18e of a mold section that surrounds a cavity 18a is provided with substantially semi-cylindrical grooves 18g. Each groove 18g on one section cooperates with a groove 18g on the next section for retaining the shank portion 11a of a terminal therebetween, as is shown in Fig. 7. The enlarged base portion 11b of the terminal bearing against the inner surface of the portion of the rim 18e defining the end of the mold cavity 18a serves to hold the spring fingers 11c pressed tightly against the end of the body 10. Thus, the mold operates in substantially the same way as does each of the second rails 15 of the centering device 12. Because of this frictional relationship of the terminals and the bodies in the molds, the bodies are held spaced from the sides of the mold cavity 18a so that the space therebetween may be filled with a moldable material to provide the molded sheath around the dielectric body 10 and the base portion 11b of the terminals.

In order to retain the assembly of mold sections, dielectric bodies and end terminals in position preparatory to molding the sheath around the condenser, there is provided a clamp 19. This clamp comprises an elongated trough 20 having substantially parallel sides 20a, a bottom 20b, a rear end 20c and a front end 20d. The upper edges of the sides 20a are recessed so as to provide space for the terminals 11.

In order to compress the mold sections 18 during the molding operation and to make a unitary assembly of the apparatus there is provided a threaded bolt 21 extending through the front end 20d of the clamp and engaging a similarly threaded opening therein. The inner end of this bolt 21 has relatively loosely mounted thereon a bearing plate 22 adapted to bear against the endmost mold section 18 and apply pressure to the entire assembly of mold sections on rotation of the bolt 21 in a normally clockwise direction when viewed from the upper end of the clamp.

The steps in the method of preparing the electrical condensers according to this invention are illustrated in the detail drawings and are illustrated semi-diagrammatically in Fig. 10. In this preparation a plurality of dielectric bodies are positioned in the centering device 12 in the manner shown in Figs. 2 and 3. A pair of end terminals 11 are then assembled for each body 10 by compressing the spring fingers 11c against the end of the body 10 and sliding each terminal down into the slot 15b in the rail 15 so that the enlarged base portion 11b of the terminal is on the inside of this rail. This distortion of the spring fingers 11c holds the dielectric body 10 firmly between the terminals by frictional holding only. As the base portions 11b of the terminals are held in place by the rails 15, this distortion of the spring fingers is maintained. The spring fingers bear against and make electrical contact with metal plates 23 at each end of the cylindrical dielectric bodies 10. These metal plates may be any of the type customarily employed such as a thin coating of silver on the end of the ceramic or other dielectric body 10.

In the next step in the manufacture of the condensers the complete condenser and terminal assembly is lifted from the centering fixture by applying pressure on the ends of the terminals. This compresses the spring fingers 11c slightly so that the assembly of dielectric body and end terminals is easily lifted from the centering device 12. This assembly of dielectric body 10 and end terminals 11, with the dieletcric body being held between the terminals by friction only, is then positioned in a mold section 18 in the position shown in Fig. 8. Here the shank portion 11a of each terminal rests in a groove 18g in the mold section 18 with the enlarged base portion 11b of the terminal bearing against the inner surface of the end of the mold cavity 18a. This engagement serves to maintain the spring fingers 11c pressed tightly against the end of the body 10 so that this body is held firmly in position by friction only and is properly spaced from the sides defining the mold cavity 18a. This positioning of the dielectric body 10 so that a space is provided between the body and the sides of the cavity is illustrated in Fig. 8. Thus, with this method there is no difficulty in properly centering the dielectric body in the mold cavity as the proper relationship of the body and each pair of end terminals is accomplished in the centering device 12. Then even though the cooperation between the end terminals and the condenser body is only frictional, this proper relationship is easily maintained while the assembly of condenser body and end terminals is transferred from the device 12 to the mold section 18.

As soon as the assembly of body and end terminals has been positioned in one mold section 18, another mold section 18 is placed on top of the first one in the manner show in Fig. 5. When this is done the rims 18e are in contact with each other and the grooves 18g on one section cooperate with the grooves 18g on the other section, to hold the shank portions 11a of the end terminals therebetween. As has been explained above, the mold cavities 18a of the mold sections completely surround the dielectric body 10 and the inner ends of the end terminals 11. This arrangement is illustrated in Fig. 8. The proper relationship of the cooperating mold sections is maintained by the engagement of the side projections 18c on one mold section with the corresponding side cavities 18d on the other mold sections, as is shown in Fig. 5.

The opposite end of this second mold section 18 is then available for positioning another assembly of dielectric body and pair of end terminals in the same manner as specified above. This assembly of dielectric body and pair of end terminals in a mold section is repeated until a sufficient number of molds have been prepared with a body and pair of terminals in each mold. Preferably this assembly of the successive mold sections is carried out in the clamp device 19. In order to aid in this assembly the device is preferably placed in front of the operator and tilted back at an angle preferably of about 45°. In order to maintain this angular relationship the device 19 may rest against a base member 24.

As soon as the clamp device is filled, as is illustrated in Fig. 7, the threaded bolt 21 is tightened to press the bearing plate 22 against the endmost mold section 18. This rotation of the bolt is continued until all the mold sections are tightly clamped together so that the joints between the mold sections are tight and secure.

The assembly of clamp 20, mold sections 18 and dielectric bodies and end terminals is then placed flat and the space in the mold cavities between the dielectric bodies and the sides of the mold sections 18 are individually poured full of a flowable moldable dielectric material. The opening formed by the sloped rim portions 18b defines an entrance into each mold cavity, as is shown in Fig. 8. Each mold cavity is poured full of the moldable material until a portion extends into the opening defined by the rim portions 18b. As is shown in the drawings, this opening is in the shape of a tapered funnel.

The flowable moldable material which is preferably a liquid is preferably first placed under vacuum in order to remove entrapped and dissolved gases. Then after the assembly of molds has been poured full of the material, the entire assembly is placed in a vacuum chamber 25, which may be subjected to about 30 inches of mercury vacuum, and is held there for a period of time, usually about 10 to 15 minutes, in order to remove occluded and dissolved gases and particularly air that has been entrapped within the mold cavity. This material has preferably previously been treated as explained above under approximately the same vacuum for about 10 minutes. During these periods the operator can be making another assembly of mold sections, dielectric bodies and end terminals in another clamp device 19. In actual production a large number of the assemblies are vacuum treated in the same vacuum chamber at the same time.

At the end of the evacuation period the clamp 19 with its assembled mold sections is removed from the vacuum chamber and the moldable material, which is preferably a liquid curable resin, is then hardened as by curing. This may be accomplished either by heating, where an elevated temperature is required, or by permitting the assembly to stand at room temperature for the necessary time where a low temperature curing mix is employed. During this curing time, the material hardens and becomes a firm solid.

As soon as the moldable material has become hardened or cured, the finished condensers are removed by loosening the threaded bolt 21 and breaking the assembly of mold sections 18 apart by hand. The flash 26a of the molded sheath 26 is then broken off by hand to produce the electrical condensers 17. Because of the tapering shape of this flash 26a, it is easily broken from the finished condenser.

The condenser 17 is made up of the dielectric body 10 and a pair of terminals 11 on opposite sides of the body. Each terminal includes a base bearing against a body and the condenser has a molded dielectric sheath 26 around the body and the bases of the terminals. This sheath serves to hold the bases of the terminals in operative relationship against the body and these bases are otherwise unattached to the body. Thus a rigid assembly is produced in a simplified manner to provide a simple construction in which the sheath 26 not only acts as a dielectric covering for the condenser but also is rigid and hard to hold the parts in their assembled relationship.

The moldable dielectric material used to produce the sheath 26 may be any of a vast number of well known materials which may be molded or cured. These materials are well known to those skilled in the art and many different types are available for use in making the electrical condensers of this invention according to the methods described and claimed herein. The preferred material is one of the many casting resins having dielectric properties that is capable of polymerizing or otherwise hardening from a fluid to a solid state either at room temperature or at an elevated temperature. The following typical formulations have been employed and have been found thoroughly satisfactory:

1.

|  | Grams |
|---|---|
| Epon 828 | 50 |
| Hardener HN 951 | 4 |

2.

| Epon 828 | 50 |
|---|---|
| Curing agent D | 5 |

3.

| Epon 828 | 30 |
|---|---|
| Thiokol LP-38 | 20 |
| Hardener HN 951 | 4 |

4.

| Araldite CN-504 | 50 |
|---|---|
| Hardener HN 951 | 4 |

5.

| Araldite CN-504 | 25 |
|---|---|
| Epon 828 | 25 |
| Hardener HN 951 | 4 |

The above formulas numbers 1, 3, 4 and 5 are capable of curing at ordinary room temperature. In order to accomplish this resin is permitted to set for a number of hours, such as 24 hours, at ordinary room temperature before the assembly of mold sections is disassembled. Formula number 2 is curable by heating and in this instance curing is accomplished by heating at a slight temperature such as approximately 200° F. in an oven for a considerably shorter time. Ordinarily polymerization would be sufficient here in not more than 5 or 6 hours.

The Epon 828 resin which is an epoxy type polymer and curing agent D are both produced by Shell Chemical Corporation of New York City. Hardener HN 951 and Araldite CN-504, which is an unmodified epoxy (ethoxyline) resin, are both produced by Ciba Company of New York City. Thiokol LP-38 is produced by the Thiokol Chemical Corporation of Trenton, New Jersey, and is a mercaptan-terminated liquid polysulfide polymer having a viscosity range of 2.5-3.5 poises viscosity and low crosslinking.

The mold sections 18 may be made of any desired material. An excellent material has been found to be a solid polyethylene. This material has sufficient rigidity and is relatively inexpensive and long-lasting. In the molding operation the mold may be coated with a separating material if desired. It is preferred that a separating material such as any of the well known silicone mold separating liquids be used to aid in removing the molded condensers from the molds and to aid in separating the mold sections at the end of the molding operation.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. The method of making a plurality of electrical condensers, comprising: positioning a plurality of solid dielectric bodies in spaced relationship to each other; pressing a pair of terminals against opposite sides of each body, each terminal including a base having yieldable means bearing against but not gripping the body; and simultaneously molding a mass of moldable dielectric material completely around said bodies and bases while maintaining said pressed relationship.

2. The method of making a plurality of electrical condensers, comprising: positioning a plurality of solid dielectric bodies in spaced relationship to each other; pressing a pair of terminals against opposite sides of each body, each terminal including a base having a plurality of spring fingers bearing against but not gripping the body and an outwardly projecting shank; and simultaneously molding a mass of moldable dielectric material completely around said bodies and bases while maintaining said pressed relationship.

3. The method of making a plurality of electrical condensers, comprising: positioning a plurality of dielectric bodies in spaced relationship; pressing a pair of terminals against opposite sides of each body, each terminal including a base bearing against but not gripping the body; transferring each assembly of body and pair of terminals to a mold while maintaining said pressed relationship; and maintaining said pressed relationship while simultaneously molding a moldable dielectric material completely around said bodies and bases.

4. The method of making a plurality of electrical condensers, comprising: positioning a plurality of solid dielectric bodies in spaced relationship to each other; pressing a pair of terminals against opposite sides of each body, each terminal including a base having a plurality of spring fingers bearing against but not gripping the body and an outwardly projecting shank; transferring each assembly of body and pair of terminals to a mold while maintaining said pressed relationship; and simultaneously molding a dielectric resin completely around said bodies and bases while maintaining said pressed relationship.

5. The method of making a plurality of electrical condensers, comprising: positioning a plurality of dielectric bodies in spaced relationship to each other; pressing a pair of terminals against opposite sides of each body, each terminal including a base bearing against but not gripping the body; transferring each assembly of body and pair of terminals to a mold while maintaining said pressed relationship; completely surrounding each of said bodies and pair of bases within its mold with a flowable moldable dielectric material; subjecting said material to a vacuum to remove entrapped gases; and molding said material while maintaining said pressed relationship.

6. The method of making a plurality of electrical condensers, comprising: positioning a plurality of solid dielectric bodies in spaced relationship to each other; pressing a pair of terminals against opposite sides of each body, each terminal including a base having a plurality of spring fingers bearing against but not gripping the body and an outwardly projecting shank; transferring each assembly of body and pair of terminals to a mold while maintaining said pressed relationship; completely surrounding each of said bodies and pair of bases within its mold with a flowable moldable dielectric material; subjecting said material to a vacuum to remove entrapped gases; and molding said material while maintaining said pressed relationship.

References Cited in the file of this patent

UNITED STATES PATENTS

| | | |
|---|---|---|
| 855,134 | Risbridger | May 28, 1907 |
| 1,315,365 | Hamm | Sept. 9, 1919 |
| 1,333,004 | Vaughn | Mar. 9, 1920 |
| 1,636,328 | Sauer | July 19, 1927 |
| 1,990,819 | Danziger | Feb. 12, 1935 |
| 2,119,744 | Heyman | June 7, 1938 |
| 2,276,380 | English | Mar. 17, 1942 |
| 2,304,764 | McAllister | Dec. 8, 1942 |
| 2,326,982 | Summers | Aug. 17, 1943 |
| 2,374,292 | Kuna | Apr. 24, 1945 |
| 2,392,311 | Christopher | Jan. 8, 1946 |
| 2,436,208 | Dressel | Feb. 17, 1948 |
| 2,511,436 | Kauth | June 13, 1950 |
| 2,527,373 | Parson | Oct. 24, 1950 |
| 2,535,517 | Rhodes | Dec. 26, 1950 |
| 2,580,612 | Schwarz et al. | Jan. 1, 1952 |
| 2,606,955 | Herrick | Aug. 12, 1952 |
| 2,713,700 | Fisher | July 26, 1955 |

FOREIGN PATENTS

| | | |
|---|---|---|
| 474,695 | Italy | Sept. 29, 1952 |